Oct. 21, 1947.    A. B. MENEFEE ET AL    2,429,477
RECOVERY OF SULPHUR FROM SULPHUR ORES
Filed March 11, 1941    2 Sheets-Sheet 1

Inventors
Arthur B. Menefee
Herbert H. Greger.

By Raymond J. Norton.
Attorney

Inventors
Arthur B. Menefee
Herbert H. Greger
Raymond J. Norton
Attorney

Patented Oct. 21, 1947

2,429,477

UNITED STATES PATENT OFFICE 2,429,477

RECOVERY OF SULPHUR FROM SULPHUR ORES

Arthur B. Menefee, Cumberstone, Md., and Herbert H. Greger, Washington, D. C.

Application March 11, 1941, Serial No. 382,845

6 Claims. (Cl. 23—293)

This invention relates to the recovery of sulphur of a high grade from sulphur ores.

The present invention deals with a process of the type described in copending application Serial No. 382,844, filed March 11, 1941. As pointed out in that application, it has been found that sulphur of a high standard of purity may be produced from sulphur-containing materials, i. e. sulphur associated with different types of gangue, by an eminently simple and effective method. Such method involves the treatment of a raw material of reasonably high sulphur content (e. g. sulphur flotation concentrates, crude ore mixed with crude sulphur and the like) under conditions of elevated temperature and agitation with a reagent which preferentially wets the gangue, does not wet the sulphur and is retained in liquid phase under the conditions of the operation. It was pointed out in such application that within relatively wide permissive ranges of reagent to gangue ratios it was possible to form agglomerates of the gangue which could be separated from the liquid phase sulphur by typical methods, such as centrifuging, draining, filtering and the like.

In further experimentation on this process, it was found that a unique and unexpectable correlation exists between several important factors in the process by the proper control of which improved results could be secured. As will be seen more fully hereinafter, it was determined that the type of agglomerates could be predetermined by properly correlating such factors as; reagent to gangue ratio; fineness of gangue and the speed, type and time of agitation. By such control, agglomerates of a definitely optimum size and improved mechanical condition may be formed. This is of peculiar importance because, as will be seen, by establishing such optimum characteristics of the modulated or agglomerated gangue it is possible to render the mass self-filtering while insuring a high recovery of purified sulphur.

Figure 1:
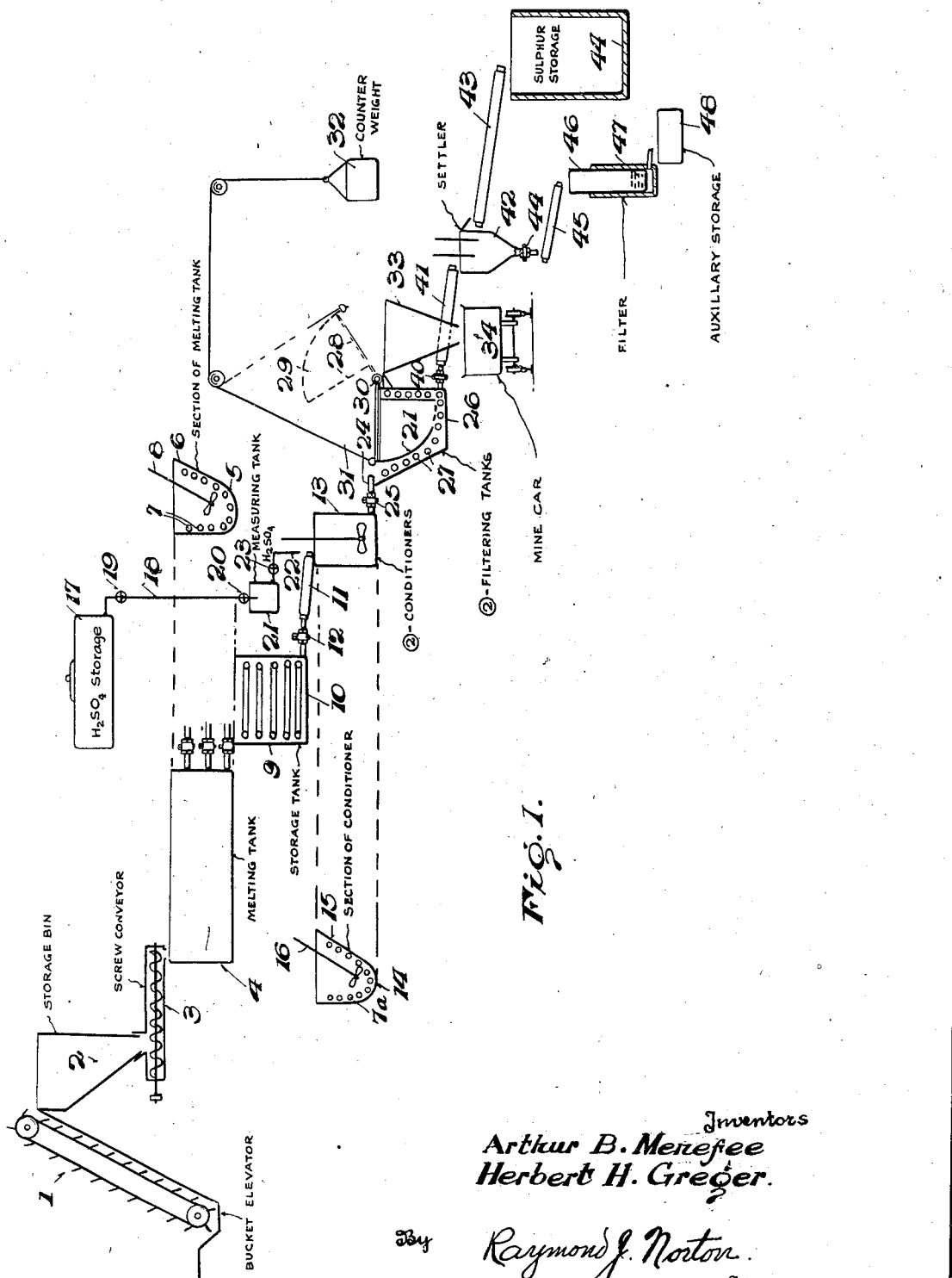

In order to enable a more ready comprehension of the invention there is shown in Figure 1 of the accompanying drawing, in diagrammatic form, a type of apparatus which may be utilized in carrying out the process.

Figure 2:
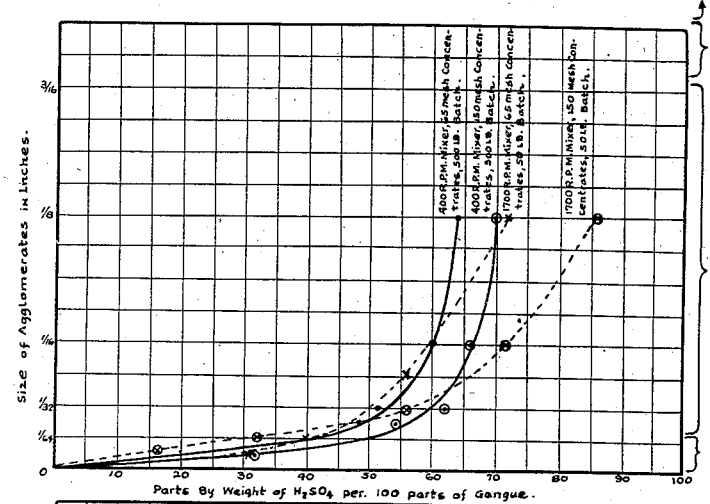
Figure 3:
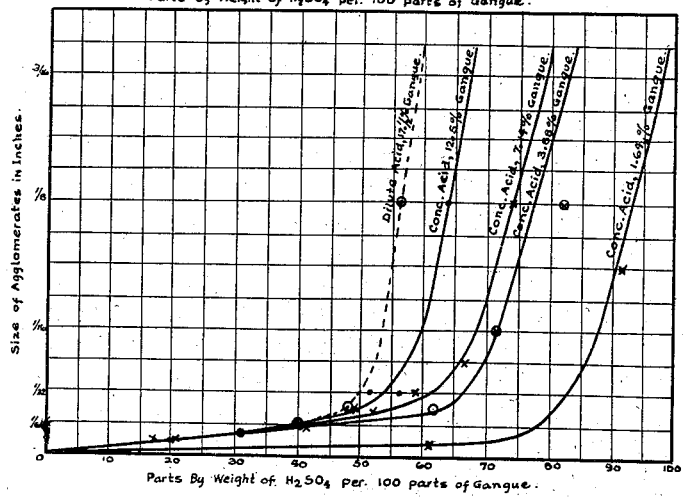
Figure 4:
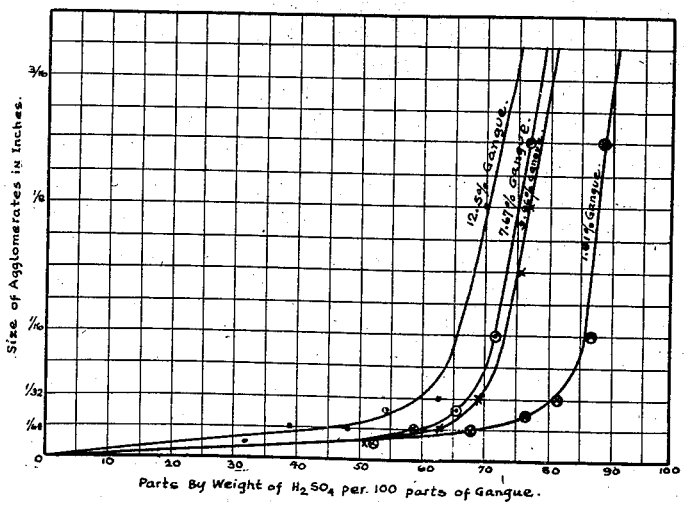

Figures 2, 3 and 4 are graphs showing the relationship of the indicated factors. It is to be understood that the particular form of apparatus shown is chosen for the purpose of illustrating a typical embodiment of the apparatus and not as indicating the exclusive means by which the steps of the new method may be effectuated.

The fundamental concept of the invention resides in the treatment of sulphur which is associated with gangue under such conditions as to liquefy the sulphur and to collect or agglomerate the gangue particles into self-sustaining nodules or balls from which the molten sulphur may drain freely. As will be more particularly observed, by proper control of conditions of the operation the gangue may be formed up into agglomerates of the optimum size such that subsequent draining or filtering of the molten sulphur is facilitated with maximum sulphur recovery.

The essential steps in the operation comprise the melting of the sulphur of the sulphur-gangue raw material and the treatment of the molten mass with a reagent which is insoluble in molten sulphur, which preferentially wets the gangue and which does not wet the sulphur. Agglomeration or nodulation of the wetted gangue is effected by agitating the mass under controlled conditions of speed and type of liquid flow. While the process would thus appear to be relatively simple it is found that there is a striking correlation existing between the several factors and that to secure optimum results these must be controlled within definite limits.

The process can best be explained by a preliminary consideration of what appears to be the actual rationale or mechanism of the unique agglomeration. It will be understood that such explanation is advanced as a rational interpretation of the process and not as a hypothesis on which the efficacy of the method depends.

From the study of the process it appears that the accumulation of separate gangue particles into larger unit masses by means of a preferential wetting agent proceeds in definite physical or physicochemical stages. The first stage consists of the wetting or filming of the gangue particles by the reagent. The second stage comprises the transition of such wetted particles into larger units by agglomeration of the smaller particles. The third stage appears to be an actual plastic moulding (achieved by the proper type of agitation) in which the cohered or agglomerated particles are compressed or worked up into optimum sized nodules of sufficient mechanical strength to permit subsequent handling as for example on filter beds and the like. If additional acid is added to the mass and the agitation is continued the gangue tends to ball up into large mushy masses. If yet additional amounts of acid are introduced the larger aggregates are broken down and the gangue tends to disperse in the liquid medium.

These several stages are established by a number of factors important among which is the actual quantity of reagent employed. As the quantity of reagent above that necessary for filming is added the agglomerates tend to form. When, however, the quantity of reagent is increased above that required for effective nodulation the agglomerated gangue tends to ball up and as more acid is added to disperse in the reagent. The several phases of the process, therefore, comprise a filming of the gangue particles with a proper reagent so as to flocculate the gangue by producing a sulphur repellant surface. Thereafter by adding more reagent and properly distributing this by means of mechanical agitation the reagent forms a coating of appreciable thickness on the gangue particle. It would appear that in these circumstances the properties of the gangue particle are changed and assume the characteristics of a droplet of liquid containing a solid core. These new units are then capable of agglomerating by aggregation of smaller droplets into larger units. Since the droplets contain rigid cores a certain degree of mechanical agitation is necessary to bring them together to form the desired agglomerated phase.

It will be appreciated in light of the preceding discussion that the important factors in the process are: the type or character of the raw material; the character and quantity of the reagent; the ratio of gangue to reagent and the method of agitation.

As noted hereinbefore, the basic principle upon which the novel operation is based is the preferential filming or wetting of the gangue material in the presence of molten sulphur and the processing of such wetted gangue to produce self-sustaining nodulated masses from which the molten sulphur may freely be filtered.

The process has been operated on sulphur ores of the disseminated type, such as Chilean ore containing hydrated silica as the chief impurity. The process is similarly efficacious for the treatment of ores containing quartz, anhydrite or other sulphates, clay and the like.

As explained in the copending application referred to, the agglomerating agent may comprise any material which is insoluble in molten sulphur; which preferentially wets and agglomerates the gangue and which can be retained in liquid phase under the conditions of the operation. Among such agents are sulphuric and phosphoric acid, hydrated salts, such as calcium chloride, magnesium chloride, zinc chloride and the like. In most circumstances sulphuric acid is the preferred reagent not only because of its cheapness and intrinsic efficacy but also because it may be produced and employed, in a cyclic system from the sulphur produced by the process.

Sulphuric acid also possesses another specific advantage. Sulphur ores, in addition to inorganic impurities, contain small quantities of organic matter, usually of the order of 0.2 per cent. Even in such minor amounts such impurities cause discoloration of the separated sulphur, probably by the formation of sulphur "dyes" of high tinctorial power. It has been found that 98 per cent sulphuric acid in addition to operating most effectively as an agglomerating agent serves also as a decolorizing agent.

In certain sulphur deposits the gangue may be composed of limestone and silicates with small amounts of metal sulphides. These substances will consume acid due to chemical reaction. When treating this type of raw material the hydrated salts mentioned above may be employed as the agglomerating agents. For most raw materials and particularly for the disseminated type of ore containing siliceous gangue, sulphuric acid is the preferred reagent. The correlation of the major factors of the process to be discussed hereinafter is based on the use of sulphuric acid as the reagent. It will be understood, however, that the same general principles will apply when using the other types of agents mentioned.

In the preferred procedure the sulphur ore is first concentrated by some suitable method as for example by froth flotation. Sulphur ores are amenable to froth flotation with a wide choice of flotation reagents and are, therefore, to a considerable extent, independent of the quantity, type and properties of the gangue. Flotation concentration of sulphur is quite efficient and provides an economical method of producing material for treatment by the novel process described herein.

There is, in a sense, a definite correlation between the concentration of the crude ore by flotation and the agglomeration of the residual gangue. The commercial range for efficient agglomeration begins where that of flotation ends. It is possible to achieve the concentration of ore to a sulphur content of between 80 and 90 per cent with an extraction of 90 per cent. Such a concentration presents an effective preliminary step in the present process for it is found, as the result of extensive tests, that agglomerative separation of gangue is most economical when the gangue is less than 25 per cent of the material processed.

It has been found that flotation concentrates produced according to the method described in copending application Serial No. 382,843, filed March 11, 1941, that is to say by means of a flotation reagent which has a boiling point below the melting point of sulphur are particularly desirable as a starting material for the present process. Such concentrates insure the production of sulphur of a more vivid color than that produced from concentrates containing high boiling flotation reagents.

The first essential step in the process, as has been noted, is the wetting or filming of the particles of gangue. This step is of special importance because proper agglomeration depends upon effective preliminary filming of the particles. The preferred method of filming consists in mixing the reagent with the concentrate before melting. Under such procedure the particles of gangue are filmed with the reagent before the molten sulphur phase is formed. After such a film has been established it is not displaced by the sulphur during the melting period. If on the other hand the concentrate is melted before the addition of reagent the molten sulphur wets the gangue and the reagent generally does not displace the molten sulphur from the gangue particles. There is, however, one exception to this; sulphuric acid of 98 per cent strength and oleum are capable of displacing molten sulphur from the surface of hydrated silica. Under similar conditions 93 per cent sulphuric acid will not effect filming.

It is to be observed, however, that the filming characteristic is more or less specific to the particular gangue which is associated with the sulphur. For example, while 66 per cent sulphuric acid will not film a sulphur-hydrated silica concentrate which has been melted 60 per cent sulphuric acid will film the surfaces of calcium sulphate wetted by molten sulphur and agglomerate the sulphate.

In carrying out the invention, operating for example on Chilean concentrates containing a gangue composed of hydrated silica, there are two methods of filming that may be employed. When using aqueous reagents it is necessary, for reasons pointed out, to add the reagent to the concentrate before melting. When dilute sulphuric acid is employed it may be added either before or during melting. It appears that in the weathering of concentrates a small quantity of sulphuric acid is formed and this quantity is sufficient to retard wetting of the gangue by the molten sulphur for an appreciable time. Utilization of strong sulphuric acid thus represents a special case to the extent that it may be added after melting has been initiated.

When concentrated sulphuric acid is employed as the wetting and agglomerating agent it may be added before, during or after melting. If for any reason the concentrates are melted and the gangue is maintained in contact with the molten sulphur for a period of time sufficient to thoroughly wet the gangue (usually about 20 hours) concentrated sulphuric acid (98%) must be used in order to displace the molten sulphur from the gangue.

It will be appreciated that the filming stage of the process may effectively be utilized for other purposes, such as drying the concentrates. Since the filming is effected by heating the mass up to the temperature of molten sulphur while agitating, the bath of sulphur is effectively employed as a heating medium to reduce the water content of the mass undergoing treatment. For example, the starting material which is employed may be a concentrate which is mechanically dewatered in a centrifuge. This material may have a water content of 20 per cent more or less. This can be dried down in the melting tank during the filming operations. Similarly the melting stage may be utilized for additional functions. For example, dilute acid which is recovered from the separated agglomerates by washing with water may be run to the melting tank and there concentrated. In the tank the excess water is evaporated until the vapor tension of the acid at the operating temperature attains equilibrium with the water vapor tension of its surroundings, for example a concentrate up to 60 per cent acid at 135° C.

As indicated previously it has been determined that for best results the sulphur concentrate which is processed should contain a minimum of 75 per cent of sulphur. As will be appreciated, the quantity of acid or other agglomerating agent which is required for effective agglomeration varies directly as the quantity and fineness of the gangue, that is to say, as the exposed surface of the gangue which must be wetted. If concentrates of low sulphur concentration are treated excessive amounts of the agglomerating agent are thus required. Again the separation of the agglomerated or nodulized gangue phase from the liquid sulphur phase entails the removal of sulphur entrained in the agglomerates and adhered as films. As a result of numerous tests it has been ascertained that the agglomerates which are drained free of the sulphur contain approximately 30 per cent of sulphur on the basis of dry ash. Sulphur losses, therefore, increase in direct proportion to the content of gangue.

There is another factor which is of not inconsiderable importance in determining the degree of preliminary concentration of the ore. Since in the operation of the process the mass must be agitated and conveyed through pipes, valves and the like, good fluidity is an important consideration. When the quantity of gangue exceeds about 25 per cent of the mass the fluidity is reduced to the extent that handling is difficult. It is to be observed, however, that even with a given gangue concentration the fluidity of the mass may be controlled to a considerable degree by regulating the size of the agglomerates. It is found that the fluidity of the mass improves during the formation of agglomerates larger than $\frac{1}{32}$ to $\frac{1}{16}$ inch apparently due to the reduction in surface contact area between the gangue and the molten sulphur phase.

As will have been appreciated, the type of agitation is an important factor in the process. In the initial stage of the process, i. e. the filming stage, agitation subserves its expectable function of insuring distribution of the reagent and wetting of the gangue. In the agglomeration stage agitation is of especial importance. As additional reagent is added, that is above that required for filming, a kneading action is necessary to complete effective movement and mutual contact of the separate filmed particles of the gangue so as to ensure their cohesion and aggregation into larger agglomerates. Since the essential objective of the new method is the production of self-sustaining agglomerates the contacted and adhered particles of gangue must be built up to an optimum size and at the same time must, to certain degree, be densified for the purpose of imparting the strength requisite to withstand the disintegrating effects of discharge and movement on a filter screen. For such a type of contact and densification a vigorous type of agitation is required so as to effect a substantially free circular sweep of the fluid within the conditioning vessel or container.

As a result of considerable experimentation it has been found that, within limits, vigorous as distinguished from violent or turbulent agitation is most effective. By properly correlating agitation with the other factors discussed above, it is possible to produce striking results, namely the production of nodules or aggregates of a surprisingly uniform size and spherical shape which are characterized by such a high mechanical strength that they may be discharged directly onto screens or other filtering media permitting a free and rapid drainage of the molten sulphur. As will be observed hereinafter, a further salient feature of the process is the possibility of predetermining the size of the agglomerates by controlling the quantity of the reagent.

The interesting and unexpectable physical changes which develop in the sulphur-gangue-reagent system can best be appreciated and evaluated upon consideration of the following typical test. Five hundred twenty five pounds of Chilean concentrate, containing about 10% moisture and ground to 150 mesh, were melted and run into a conditioning tank. In this tank the mass was heated up to a temperature of about 135° C. and the temperature was maintained at substantially this value throughout the treatment. Similarly throughout the described treatment the mix was agiated with a 400 R. P. M. "Lightning mixer." Initially 5.25 lbs. (1%) of 98% $H_2SO_4$ was added. The mix was agitated for a half hour during which period there was no observable change in condition. The material remained a viscous mass. At the end of this period and while the mass was continuously agitated another 5.25 lbs. of acid was added; at this stage the viscosity increased and the molten sulphur became free from the gangue. A subsequent addition of another 5.25 lbs. of acid did not materially change the physical condition of the mass. Upon the addition of another 5.25 lbs. of acid (now 4%) the mass was still viscous but the formation of agglomerates of about $\frac{1}{64}$ inch was initiated. The mass was continuously agitated with this concentration of acid for a period of 15 minutes but the essential condition remained unaltered. Another 1% of acid was then added but this amount did not have any essential effect. Upon the addition of yet another percent of acid (now 6%) the average size of the agglomerates was about 1/64 inch but a small percentage of larger agglomerates began to form. A further addition of another percent of acid produced an observable growth in the size of agglomerates and at this stage all agglomerates were greater than 1/64 inch. The further addition of another percentage of acid (now 8%) effected the formation of agglomerates of about 1/32 inch in diameter and this size was retained even after another increment of 1% of acid was added. Thereafter 2.5 lbs. of acid (now 8.75% total) was introduced into the mix. Under the action of the mixer the agglomerates then built up to 1/16 inch and after about 10 minutes agitation had increased to about 1/8 inch. Agitation for an additional 20 minutes caused the agglomerates to increase to larger than 1/8 inch.

It will be observed from the foregoing that there is a definite relationship between the quantity of reagent and the agglomerate size. It will also be perceived that after an addition of 8.75% of acid agitation alone increased the size of the agglomerates from about 1/16 inch to about 1/8 inch.

After this treatment the mix was discharged and filtered on an inclined 1/8 mesh screen. Of the total charge 361.75 lbs. of a bright colored sulphur and 140.25 lbs. of agglomerates were recovered.

The above described test is typical of a large number which have been carried out to determine the interrelationships mentioned herein. Similar tests were conducted using a high speed mixer, i. e. 1700 R.P.M., to establish the effect of agitation. As a result of such tests it was found that, other conditions being equal, a high speed mixer will produce the same size agglomerates as a relatively low speed mixer up to agglomerate size of about 1/16 inch in diameter. However, above 1/16 inch the disintegrating effect of the high speed agitation is apparent and a larger amount of reagent is necessary to produce larger agglomerates over the corresponding requirements of low speed agitation. It will be apparent that while agglomeration is a relatively rapid action at the proper reagent-gangue ratio, the desideratum herein, namely the uniformity of size of the agglomerates requires some time. During agitation the growth of the individual agglomerates is not necessarily uniform. As agitation continues the smaller units tend to build up into larger aggregates and the over size agglomerates, under the kneading action, tend to decrease. Hence for the establishment of uniform size of agglomerates an equilibrium period is required. It is found that under properly controlled conditions this equilibrium may be attained when all the reagent is added as a single charge in a period of from about 15 to 30 minutes. Since the ultimate object of the process is to produce a purified sulphur from crude ore it is of paramount importance to carry out the agglomeration to that point or extent which will insure a minimum ash content in the recovered sulphur. As a result of tests it has been established that by utilizing the present method purified sulphur may be produced having an ash content below 0.05%. By proper operation, particularly in the filtration step, a sulphur of a considerably lower ash content may be produced and in some cases as low as .0003%. This low ash content of the sulphur may be insured by forming agglomerates of between 1/32 to 1/16 inch and utilizing these as a filtering medium or filter bed of at least 1/2 foot in depth. This especially high purification appears to be due to the fact that with such a size of agglomerates the very fine particles (unagglomerated or partially agglomerated gangue) adhere to the acid-wet larger agglomerates. When utilizing these smaller agglomerates as a filter bed it is possible to filter at the rate of about ten tons of sulphur per square foot per day. With larger size agglomerates constituting the filter bed, i. e. 1/8 inch or larger, the filtration of the fine particles is not so effective. However, when utilizing agglomerates of approximately 1/8 inch as a filter bed it is possible to obtain as a filtrate purified sulphur of .05% ash or less and, of course, at a much more rapid filtering rate than with the filter bed made up of the smaller agglomerates, i. e. at a rate of about 20 tons a day.

Such a type of self-filtration, i. e. one in which the solids in a special size and/or shape are used as a filtering medium, is self-renewing. As the agglomerates are continuously deposited in the filtering container there is no possibility of the fines accumulating in a dense stratified layer and thus clogging the bed. The agglomerates forming the bed serve also to remove precipitated organic matter and finely divided solids as well as removing free acid from the molten sulphur.

The interrelationships of the several factors which have been discussed are more readily apparent from a consideration of the graphs shown in Figures 2, 3 and 4. The data embodied in the graphs were obtained as a result of a series of runs or tests in which the indicated variables were changed. In these experiments the raw material used was a Chilean concentrate of either a minus 65 mesh or a minus 150 mesh. These tests were made with substantial charges of raw material from about 500 to 800 lbs. so as to approximate commercial conditions. The melting and agglomeration was carried out either in a steam jacketed kettle provided with a high speed mixer or a square conditioning tank with a rounded bottom having steam coils for heating on which a low speed mixer was mounted. The high speed mixer was a 1700 R. P. M. 1/4 H. P. mixer and the low speed mixer was a 400 R. P. M. 1/2 H. P. mixer with a 10 inch diameter propellor.

The operations involved the melting of the charge and elimination of water and the subsequent filming and agglomeration of the gangue particles by addition of sulphuric acid in stages. It was observed that the agglomerates attained their equilibrium size, for a given acid concentration, in about 10 minutes in the kettle and in about 20 to 25 minutes in the conditioning tank. These respective time intervals were maintained for the separate additions of acid.

In the graph the ratio of reagent to gangue is expressed in terms of the weight of acid per 100 parts of gangue. In the majority of the tests illustrated in the graph the reagent employed was 98% $H_2SO_4$. In the graph shown in Figure 3 the relationship of dilute $H_2SO_4$ (73.5%) to the concentrated $H_2SO_4$ in respect to the formation of agglomerates is also shown.

In Figure 2 the effect of variations in the mesh size and the type of character of agitation is shown. The results depicted in this graph were obtained by treating a sulphur concentrate of 12½% gangue content with 98% $H_2SO_4$. As will be observed from an inspection of the plotted results, in the lower ranges of acid to gangue ratio the curves for the different mesh sizes and differential agitations are relatively closely adjacent. This area, i. e. up to 35 parts by weight of acid to 100 parts of gangue, as will have been appreciated, comprise what may be designated as a flocculating or a filming range. Beyond this, with increasing quantity of acid, the gangue particles respectively adhere or cement and build up to aggregates of substantial size. In this area of the curve and up to agglomerate sizes of $\frac{1}{32}$ to $\frac{1}{16}$ inch a considerable quantity of reagent is required alike for high and low speed agitation and for different mesh sizes. However, when the quantity of acid is increased to the order of 55 parts by weight of the gangue a sharp break occurs in each curve and the importance of variations in the different factors becomes luminously apparent. Above this range small variations in a quantity of reagent produces major changes in the size of the agglomerates.

With respect to the mesh size it is clear from the graph that with a finer mesh an additional quantity of acid, of any given concentration, is required to produce agglomerates of the desired optimum size. This, of course, is expectable because of the increased area of the finer mesh material which must be wetted by the acid.

The unexpected effect of the type of agitation is clearly shown in Figure 2. While the higher speed agitation appears to accelerate the initiation of the agglomerates (i. e. between $\frac{1}{64}$ and about $\frac{1}{32}$ inch), there is a sharp divergence in the curves for the production of the larger size agglomerates. As is the case with a lower speed agitation the finer mesh requires considerably more reagent for the same size agglomerates. Taking the quantity of acid as the norm of efficiency or economy it will be seen that the higher speed or violent agitation requires considerably more acid than slower speed agitation for comparable results. Other things being equal it is clear that, within limits, marked advantages accrue by employing relatively coarse mesh material and utilizing vigorous but not violent agitation.

In Figure 3 is shown the effect of the quantity of reagent on the size of agglomerates when the strength of the acid and the concentration of gangue are varied. The tests depicted in these curves were made on a 65 mesh concentrate. The concentrated acid utilized was 98% $H_2SO_4$. The agglomeration was effected by agitation with the 400 R. P. M. mixer. In the actual operations the sulphur concentrate was wetted and filmed with 2½ lbs. of 98% $H_2SO_4$ per 100 lbs. of feed. To determine the effect of dilute acid on agglomeration, in certain runs, the agglomeration was effected by adding different amounts of 60% $H_2SO_4$. The curve for dilute acid shown in the graph (73.5%) is thus the ultimate or average concentration of the acid used in the runs illustrated by this curve.

It is interesting to note that whereas agglomerates of ⅛ inch are formed from 65 mesh concentrate by approximately 64 parts by weight of 98% acid the same result is obtained with 56 g. of 73.5% acid. Taking the specific gravity into account and then compared on the volume basis therefore the two results are essentially identical. It will be appreciated then that the use of dilute acid insures appreciable savings. It is to be remembered that inasmuch as the reagent must be retained in the liquid phase at the operating temperature (about 135° C.) the minimum acid concentration is about 60% $H_2SO_4$ at atmospheric pressure.

The results graphically illustrated in Figure 3 clearly bring out an essential feature of the process, namely that the acid-gangue ratio must be carefully adjusted to secure the best results. In an illustrative case, when the gangue comprises 12.5% of the mass to be treated, optimum agglomeration is effected with moderate amounts of acid. However, if the percentage of gangue is decreased the acid requirements relatively are commensurately increased. As shown, the material containing 1.64% of gangue requires 93 parts of acid by weight as compared to about 63 parts by weight of acid when the charge contains 12.5% of gangue. While not shown on the graph, it will be appreciated that when the charge contains more than 12½ per cent of gangue the relative acid requirements are decreased. This increase in the relative amount of the reagent when the gangue concentration decreases is, of course, undesirable. Where the raw material is normally low in gangue it has been found advantageous to add to the mix agglomerates produced in a previous run.

The graph shown in Figure 4 is generally similar to that of Figure 3. This graph depicts the results of treating concentrates of minus 150 mesh, and containing different percentages of gangue, with acid. These curves conform generally to those of Figure 3 but show the expectable increase in acid quantity required due to the finer mesh.

It has been pointed out previously that in respect to the present process there is a specific correlation between the initial concentration of the ore and the purification of its contained sulphur by agglomeration. The normal motive in a concentration method, including the concentration of sulphur by flotation, is to secure as great a concentration as is economically possible. It had not been realized heretofore, and it is an unexpectable finding, that there is such an important relationship between the quantity of gangue and the quantity of acid required for proper agglomeration. A novel incident of the present process, it will be noted, is the possibility of treating concentrates of low gangue content in a most efficient manner. For this purpose it is necessary only to add an amount of gangue to the conditioning tank, or leave such amount in the tank from a prior run, so as to build up the gangue concentration to that degree which insures optimum agglomeration. Thus if the feed contains say 3% of gangue an equivalent of about 9% of gangue, or similarly functioning material, can be added or left in the conditioning vessel, the whole charge may then be agglomerated on the basis of a more efficient acid to gangue ratio.

The utilization of minimum quantities of reagent in addition to effecting savings in operating cost also has a positive technical advantage. Other things being equal the lower quantity of the reagent insures a firmer type of agglomerate, which, as previously pointed out, is of importance in the separation of sulphur from the associated agglomerates. The speed of handling the discharge from the conditioning tank and the depth of the filter bed which can be built up without break down of agglomerates and consequent packing is directly dependent on the mechanical strength of the agglomerates.

It has been pointed out that hydrated silica which is associated with sulphur in Chilean ore may readily be wetted and agglomerated so as to produce a self-filtering mass. It is clearly to be understood that the ore mentioned is but an illustrative one and that the present improved method is not by any means limited to this as the exclusive starting material. Tests have established that such materials as quartz, volcanic ash and the like in association with sulphur and treated with the proper amounts of reagent may be agglomerated into self-sustaining agglomerates of a uniform size from which molten sulfur is freely filterable. As previously pointed out, reclaimed gangue may be used as an addition agent to the melt to build up the desired quantity of gangue.

It is also to be understood that it is eminently feasible to utilize the novel process for the direct treatment of relatively high grade sulphur-containing ores, such as Chilean ores of the massive type. Certain of the massive types of sulphur ores, i. e. those in which the sulphur is incorporated in a gangue matrix, are difficult to concentrate by flotation. This type of material may be processed directly by the novel agglomeration method to produce clarified sulphur as is evidenced by the following test:

A high grade Chilean ore (from the Chauviri volcano) of the massive type and containing 66.8% sulphur was roll crushed. Fifty pounds of purified, decolorized sulphur, containing less than 0.015% organic matter was melted in a steam jacketed kettle and to this was added 50 pounds of the roll ground ore. During melting 8 pounds of 60% sulphuric acid was added and the mass was agitated with a ¼ H. P. "Lightnin'" mixer operating at 1725 R. M. P. It was found that in addition to the initial 8 pounds of acid, 5.5 pounds more were required to form agglomerates ⅛ inch in diameter. The formed agglomerates were firm and of a gray color instead of the black color characteristic of a melt containing considerable organic matter. The resulting product filtered readily and the sulphur filtrate was of a good color. From the charge 76.75 pounds of sulphur, containing 0.015 carbon and 29.25 pounds of agglomerates were recovered. The agglomerates analyzed 21.0% sulphur. In this treatment the gangue concentration was 16.6% and the gangue to acid ratio was 1.215 to 1. The recovery of sulphur from the ore was 80%.

With the foregoing principles of the invention in mind it will be appreciated that they may be embodied in a number of specifically different processes utilizing a variety of apparatus. To more completely explain the invention a typical physical embodiment is shown in Figure 1. It is clearly to be understood that the apparatus here shown and the particular steps or sequence of steps described are purely illustrative and are not limiting short of the scope of the broader inventive concepts as expressed in the claims.

As shown in the drawings, the charge to the unit may be transported from a stock pile by means of any suitable conveying mechanism such as the bucket elevator 1 and deposited in the storage bin 2. As already indicated the charge comprises a sulphur-containing material having not much in excess of 25% gangue and preferably of the order of 12 to 15% gangue. As is more particularly explained in copending application Serial No. 384,508, filed March 21, 1941, the charge may comprise a partially purified or off-colored sulphur to which inorganic agglomerative material (gangue, quartz, etc.) may be added.

The material in the storage bin 2 preferably is fed by gravity to a screw conveyer 3 which transports the material to the melting tank 4. This tank is of a size adequate for the requirements of the particular plant. This may be a square or oblong tank provided (as shown in the sectional view) with a curved bottom 5 and an angular side 6 of about 60 degrees. It has been found advisable to so design the tank as to provide two feet of space above the surface of the melt to allow for foaming. As shown, the tank is provided with suitable heating means such as the steam coils 7. The tank may be constructed of any suitable material, such as corrosion-resistant steel or the like. The tank is of substantial capacity with respect to the subsequent units. It has been found desirable to feed the concentrates, or other materials to be treated, into a molten bath maintained in the tank so as to thus utilize effective heat transfer from the molten bath as well as from the heating coils. To insure a thorough mixing of the entering solids with the molten bath a suitable agitating mechanism, such as the mixer 8, is mounted in the tank.

As pointed out previously, there are two general methods by which the process may be effected; one is by the use of a dilute reagent, such as 66% $H_2SO_4$ and the other by the use of 98% $H_2SO_4$. When dilute acid is used it is necessary to add it to the mix prior to the time when the charge is heated to such a degree as to expel the moisture and effect wetting of the gangue by molten sulphur. When dilute acid is used it is, therefore, advisable to add it, at least in part, to the material in tank 4. The quantity of dilute acid necessary for optimum agglomeration is added in the conditioning tank to be described. Where the reagent employed is 98% acid (as in the described embodiment) it may be added to the melt after discharge from the melting tank.

In order to insure a flexible operation by having an adequate supply of molten concentrate for processing, a storage tank of the type shown at 9 may be utilized. To retain the melt in the fluid condition the tank is provided with the heating coil 10.

The molten material which is to be treated is withdrawn from the storage tank 9 through the insulated line 11, controlled by valve 12 and discharged into the conditioning tank 13. In the preferred embodiment a battery of two of such conditioning tanks is utilized. As shown in the sectional view these tanks are similar in design to the melting tank 4 and are provided with a curved bottom 14 and one inclined side 15. Within the tank is mounted the mixer 16 which, according to principles already set forth, insures vigorous as distinguished from violent mixing. The conditioning tanks, as shown, are provided with the heating coils 7a to maintain the desired temperature conditions.

The tank 17 containing the sulphuric acid or other reagent is connected through line 18, controlled by valves 19 and 20 to the measuring tank 21. The measuring tank in turn discharges through line 22, controlled by valve 23, into the conditioner 13. In a given run the desired quantity of a reagent is withdrawn from storage 17, measured in tank 21 and then discharged either in sequential quantities or in the desired total quantity into the material in the conditioner.

As has been explained, in the conditioning tanks the material is agitated under such conditions and for a period of time sufficient to insure the formation of agglomerates of uniform optimum size.

The conditioning tanks 13 discharge through line 24, controlled by valve 25, into the filtering containers 26. If desired the valves 25 may be steam-jacketed.

These filtering tanks are provided with an inclined side adjacent the discharge 24 and are fitted with the heating coils 27. To insure a rapid through-put of material the filtering tanks are fitted with an inside container serving both as a filtering screen and a discharge or dump mechanism. Such container may comprise foraminous or perforated side plates and back plate 28 and the perforate curved bottom plate 29. This unit is hinged at 30 and is connected to a suitable elevating mechanism, such as the cable 31 and counter weight 32 whereby it may be elevated so as to dump the drained agglomerates into the hopper 33 and thence to the mine car or other conveying mechanism 34.

With this type of construction, after the termination of a conditioning period, a batch of material is discharged from tank 13 into the curved or inclined screen 21. Due to the optimum size of the agglomerates the molten sulphur rapidly filters through to the bottom of the filtering tank. During this operation a high fluidity of the sulphur is maintained by means of the heating coil 27. The filtered sulphur is continuously discharged through valve 40 and insulated line 41 into the settling tank 42. This tank may be of any suitable construction providing for the settling of heavy impurities to the bottom and the overflow or decantation of filtered sulphur from the top. The clear filtered sulphur flows through insulated line 43 to the sulphur storage tank 44. In the settling tank 42 the fine agglomerates which pass through the agglomerate filter bed rapidly settle to the bottom. Any carbonaceous matter which comes through with the filtered sulphur from the filter tank 26 tends to rise to the top of the settling tank 42. By means of suitably positioned baffles 42 such fine material accumulating on the surface can be segregated from the effluent sulphur and skimmed off at intervals. The gangue particles which settle to the base of the settling tank are drawn off at intervals through the valve 44 and are discharged through line 45 into a supplemental filter 46. This filter is preferably steam-jacketed and may be provided with a filter bed 47 of sand or other suitable material which functions to filter out the finely divided gangue from the associated molten sulphur. The sulphur filtering through this bottom is collected in the auxiliary storage 48.

The method of operation will have been appreciated from the preceding discussion of the general principles and the description of the apparatus. In conducting the process the raw material charged to the system which may for example comprise a flotation concentrate containing 20% of moisture is fed to the melting tank 4 in which, as indicated, a previously melted bath is maintained. In the melting tank a steam pressure of the order of 80 lbs. is carried in the coils and a charge to this tank is quickly melted. Molten material from the melting tank is tapped to the storage tank 9 and retained there in molten condition. The molten concentrate, which during the melting period has been substantially dehydrated, is then charged to a conditioner 13. Acid from the storage tank 17 in measured amounts is fed into the conditioner. This acid preferably is added in sequential stages, sufficient amounts being added at the beginning to properly film the particles. The additional amounts of acid up to the required optimum are subsequently introduced. Preferably the material in the conditioner tank is subjected to the type of agitation previously described, that is to say with a mixer operating at about 400 R. P. M. The quantity of acid added is predetermined by the factors discussed hereinbefore, that is to say by the mesh size or fineness of the concentrate, the percentage of gangue in the concentrate and the desired particle size of the ultimately formed agglomerates. As will be seen from inspection of Figure 2 utilizing a 400 R. P. M. mixer on a charge of concentrate having 12.5% of gangue the optimum quantity of reagent is between about 63 and 70% (per 100 parts of gangue) equivalent to about 7.8% to 8.7% of acid based on the total charge.

In the conditioner the agitation is continued through the equilibrium period described, that is to say until the agglomerates of uniform optimum size have been formed. In normal circumstances such results are achieved in from 15 minutes to one half hour more or less.

If a high speed mixer is employed the quantity of acid must be modified in accordance with factors previously expressed and graphically depicted in Figure 2.

After the agglomeration has been effected the charge is dumped into the filter 26. In the preferred method of operation a fraction of the charge in the conditioner is retained so as to keep the propeller immersed. For example, in the event that a charge to the conditioner 13 consists of 1.5 ton it is advisable to retain about one half ton for treatment with the subsequent charge.

The molten sulphur with the contained uniformly sized agglomerates is discharged onto the inclined screen 29 and the fluid sulphur freely filters through the agglomerate bed which is built up. This clarified sulphur is withdrawn through line 41 to settling tank 42 in which further separation occurs in the manner described. The clarified sulphur free from fine suspended gangue particles is withdrawn to storage 44 and an additional quantity of purified sulphur is recovered from the filter 46.

After the sulphur has drained from the agglomerate bed in the filtering container 26, the filtering unit is elevated and the drained agglomerates dumped into car 34 or other conveying mechanism. The agglomerated material may be subjected to any desired treatment. For example, these agglomerates may be given a water wash to take up any adherent sulphuric acid and the resulting dilute acid may be concentrated in any desired manner. For this purpose it may be returned directly to the melting tank in which, due to the effective heat transfer it is concentrated simultaneously with the melting of a charge. Where conditions warrant such gangue may be roasted to drive off the container sulphur as sulphur dioxide which may be utilized, in the known manner, for the production of sulphuric acid to be employed in the system. The residue from the roasting operation provides a specially effective inorganic material for decolorizing sulphur by the described agglomeration method as described in copending application Serial No. 384,508, filed March 21, 1941.

The process described hereinbefore, as explained, is based on the utilization of 98% sulphuric acid. Where more dilute acid is employed the process is essentially the same subject to observing the precautions that the dilute acid, at least in sufficient amounts for filming must be added before the concentrate is dewatered to too great an extent. When utilizing dilute acid the quantity of this reagent should be adjusted in accordance with the principles expressed and shown in Figure 3.

It will be understood that while sulphuric acid in various strengths has been described as the reagent the fundamental principles developed herein apply equally to the other reagents mentioned, that is to say, the hydrated salts which can preferentially wet the gangue, which are not wetted by sulphur and which can be retained in liquid phase under the conditions of the operation.

It will be observed that the described method presents an eminently simple and effective process for the production of a purified sulphur from crude starting material. Utilizing simple equipment and cheap and readily available reagents, sulphur of a high purity and conforming to most rigorous specifications of color and chemical analysis can be produced. The unexpected correlation of the several factors described herein, and which is established by the invention, permits a very accurate control of the operation. The process insures the agglomeration of the undesired inorganic and organic material into self-sustaining units which are freely separable from sulphur and which subserve the additional function of providing an excellent filter medium insures high recovery of a high purity sulphur.

While a preferred embodiment of the invention has been described it is to be understood that this is given to illustrate the underlying principles involved and not as limiting the invention to any specific use or arrangement of apparatus or particular sequence of manipulative steps.

We claim:

1. That method of producing a purified sulphur from a sulphur associated with finely divided gangue which comprises, liquefying the sulphur and vigorously agitating the molten mass in the presence of a liquid agent which has a boiling point higher than the melting point of sulphur, a lower specific gravity than sulphur and which preferentially wets and agglomerates the gangue, the agitation being conducted in such manner and the ratio of wetting agent to the finely divided associated gangue being such that dense spheroidal agglomerates of at least 1/64 inch in diameter are formed, and separating the molten sulphur from the formed agglomerates.

2. That method of recovering sulphur from sulphur ores in which the sulphur is associated with finely divided, inorganic material which comprises, heating the material to liquefy the sulphur, vigorously agitating the molten mass in the presence of a liquid reagent which has a higher boiling point than the melting point of sulphur, a lower specific gravity than sulphur and which preferentially wets the gangue, the agitation being conducted in such manner and the ratio of wetting agent to the finely divided associated inorganic material being such that dense spheroidal agglomerates of between 1/64 and 3/16 inch in diameter are formed, and separating the molten sulphur from the formed agglomerates.

3. That method of separating sulphur from high melting, finely divided associated solid inorganic material which comprises, heating the mass to liquefy only the sulphur, vigorously agitating the mass in the presence of a liquid reagent which has a boiling point above the melting point of sulphur, a lower specific gravity than sulphur and which preferentially wets the solid material, the agitation being conducted in such manner and the ratio of the wetting agent to the finely divided associated solid inorganic material being such that dense, self-sustaining spheroidal nodules of at least 1/16 inch in diameter are formed, and separating the molten sulphur from the agglomerates.

4. That method of separating sulphur from relatively high melting, finely divided associated solid inorganic material which comprises, converting the sulphur to the molten state, filming the non-sulphur material with a preferential wetting agent which wets the said material but which does not wet the sulphur and which has a higher boiling point than the melting point of sulphur and a lower specific gravity than sulphur, by agitating the mass in contact with such wetting agent, the agitation being conducted in such manner that the ratio of wetting agent to the finely divided associated solid inorganic material being such that dense spheroidal agglomerates of at least 1/16 inch in diameter are formed, discharging the mass onto a retaining medium and filtering the molten sulphur through the formed agglomerates.

5. A method of recovering sulphur from material containing sulphur and associated finely divided solid inorganic material which comprises, heating the material up to the melting point of sulphur, vigorously agitating the melt in the presence of sulphuric acid, the agitation being conducted in such manner and the ratio of the acid to the finely divided associated solid inorganic material being such that dense spheroidal nodules of at least 1/16 inch in diameter are formed, and separating the molten sulphur from the agglomerates.

6. A method of recovering sulphur from material containing sulphur and associated finely divided solid inorganic material which comprises, heating the material to liquefy the sulphur, agitating the melt in the presence of 98% sulphuric acid, the agitation being conducted in such manner and the ratio of the acid to the finely divided associated solid inorganic material being such that dense nodules of at least 1/16 inch in diameter are formed, and separating the molten sulphur from the nodules.

ARTHUR B. MENEFEE.
HERBERT H. GREGER.

REFERENCES CITED

The following references are of record in the file of this patent:

UNITED STATES PATENTS

| Number | Name | Date |
|---|---|---|
| 204,206 | Eames | May 28, 1878 |
| 298,734 | Dickert | May 20, 1884 |
| 1,457,793 | Perry | June 5, 1923 |
| 1,990,602 | Guernsey | Feb. 12, 1935 |
| 1,884,634 | Bushnell | Feb. 9, 1935 |
| 1,889,429 | Wiegand | Nov. 29, 1932 |
| 1,697,402 | Nutter | Jan. 1, 1929 |
| 1,656,505 | Schwab | Jan. 17, 1928 |
| 955,012 | Sulman | Apr. 12, 1910 |
| 793,808 | Sulman et al. | July 4, 1905 |

OTHER REFERENCES

Gaudin, "Flotation," pages 345–346. Pub. by McGraw-Hill Co., N. Y.